United States Patent
Yin et al.

(10) Patent No.: US 12,305,006 B1
(45) Date of Patent: May 20, 2025

(54) METHODS FOR CATALYTICALLY DEGRADING POLYOLEFIN PLASTICS AT LOW TEMPERATURES

(71) Applicant: HEFEI INSTITUTES OF PHYSICAL SCIENCE, CHINESE ACADEMY OF SCIENCES, Anhui (CN)

(72) Inventors: Huajie Yin, Hefei (CN); Tengxiu Tu, Hefei (CN); Yijin Wu, Hefei (CN); Haimin Zhang, Hefei (CN); Guozhong Wang, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 19/008,767

(22) Filed: Jan. 3, 2025

(30) Foreign Application Priority Data

Jul. 30, 2024 (CN) .......................... 202411027340.3

(51) Int. Cl.
*C08J 11/16* (2006.01)

(52) U.S. Cl.
CPC ............ *C08J 11/16* (2013.01); *C08J 2323/06* (2013.01); *C08J 2323/12* (2013.01)

(58) Field of Classification Search
USPC ........................................................ 521/47
See application file for complete search history.

(56) References Cited

U.S. PATENT DOCUMENTS

| | | |
|---|---|---|
| 2009/0028766 A1 | 1/2009 | Imamura |
| 2024/0182786 A1 | 6/2024 | Lepinay |

FOREIGN PATENT DOCUMENTS

| | | |
|---|---|---|
| CN | 103588989 A | 2/2014 |
| CN | 105384170 A | 3/2016 |
| CN | 108003379 A | 5/2018 |
| CN | 108394889 A | 8/2018 |
| CN | 112745209 A | 5/2021 |
| CN | 113979852 A | 1/2022 |
| CN | 115873301 A | 3/2023 |
| CN | 117720400 A | 3/2024 |
| GB | 559426 A | 2/1944 |

OTHER PUBLICATIONS

Su, Jian, Study On the Catalytic Pyrolysis of Packaging Waste Polyolefin By AlCi3—NaCi Eutectic Salt, Chinese Master's Theses Full-text Database Engineering Science and Technology Series I, 2021, 116 pages.
Chen, Saijun et al., High temperature corrosion behaviour of the 316 stainless steel in NaCl—KCl—AlCl3 molten salt and its vapour, Corrosion Science, 227: 1-9, 2024.
Decision to Grant a Patent in Chinese Application No. 202411027340.3 mailed on Sep. 2, 2024, 5 pages.

*Primary Examiner* — Terressa Boykin
(74) *Attorney, Agent, or Firm* — Porus IP LLC (57) ABSTRACT

A method for catalytically degrading polyolefin plastics at a low temperature is provided. The method uses NaCl—KCl—AlCl$_3$ molten salt as the catalyst and adds KHCO$_3$ as an additive. Without adding organic solvents, the polyolefin plastics are successfully degraded at a reaction temperature of 90-100° C. The mass recovery rate of degraded polyolefin plastics is more than 99%, and the selectivity of gaseous and liquid products is both more than 90%. The mass recovery rate of the molten salt catalyst was more than 97% after 5 cycles. The molten salt catalysts of the present disclosure can effectively reduce the temperature of the catalytic reaction, and improve its degradation rate and selectivity, solving the technical problems of low conversion efficiency, high cost, and difficulty in catalyst recycling existing in the degradation of the polyolefin plastics, and realizing high efficiency, high selectivity, low cost, and low energy consumption in the polyolefin plastic degradation.

10 Claims, 7 Drawing Sheets

METHODS FOR CATALYTICALLY DEGRADING POLYOLEFIN PLASTICS AT LOW TEMPERATURES

CROSS-REFERENCE TO RELATED APPLICATIONS

This application claims priority of Chinese Application No. 202411027340.3, filed on Jul. 30, 2024, the entire contents of each of which are hereby incorporated by reference.

TECHNICAL FIELD

The present disclosure relates to the technical field of polyolefin plastic degradation, and in particular, to a method for catalytically degrading polyolefin plastics at low temperatures.

BACKGROUND

Polyolefin plastics mainly include polyethylene (PE), polypropylene (PP), polystyrene (PS), polyvinyl chloride (PVC), etc. As the most important thermoplastic in the world, polyolefin plastics have properties such as light weight, durability, firmness, and low price, as well as relatively high electrical insulation performance and corrosion resistance. Polyolefin plastics have very important applications in food packaging, daily-use containers, pipelines, building materials, electronic and electrical equipment, agricultural films, automobile parts etc. However, due to the extensive use of plastics, the disposal of waste plastics has become a very thorny problem, with early 60% of plastic products worldwide are landfilled or discarded into the environment without being treated. Since polyolefins are a type of saturated hydrocarbon lacking reactive functional groups, they are difficult to degrade under natural conditions, resulting in a large accumulation and becoming an increasingly serious white pollution problem. Therefore, research on how to achieve efficient degradation, conversion, and recycling of polyolefins has received widespread attention.

The methods for the degradation, conversion, and recycling of the polyolefin plastics mainly include physical and chemical methods. The physical method requires classification, cleaning, drying, and high-temperature degradation before reprocessing, which is relatively simple and feasible, but high-temperature degradation can cause problems such as disordered breakage of polymer chains and reduced performance, resulting in lower quality of recycled plastics and limited application fields. The chemical method involves converting the polyolefin plastics into small molecules (usually gases or liquids) through a series of chemical reactions, and these small molecules can be further transformed into related petrochemical products or plastic raw materials, achieving dual benefits for the environment and the economy. Polyolefins are composed of inert saturated C—H and C—C bonds, and the activation, conversion, and breakage processes of C—H and C—C bonds all require a large amount of energy. In addition, the controllability of the pyrolysis process of polyolefins is relatively low. Catalysts or additives need to be introduced to regulate the degradation reaction, reduce the cracking temperature of polyolefins, adjust the composition of degradation products, and improve the selectivity and yield of target products. Currently, the catalysts used for the polyolefin plastic degradation include zeolite molecular sieves and noble metal-based catalysts and the addition of these catalysts can reduce the cracking temperature of polyolefins to around 200° C. However, the chemical recycling technologies of these catalysts generally have problems such as high cracking costs, low catalytic conversion efficiencies, unsatisfactory selectivity, and low added value of products. Therefore, there is still a lack of methods that can achieve high-efficiency, high-selectivity degradation of polyolefin plastics and enable high-value recycling of catalysts.

SUMMARY

One or more embodiments of the present disclosure provide a method for catalytically degrading polyolefin plastics at a low temperature, comprising: S11, mixing anhydrous sodium chloride, anhydrous potassium chloride and anhydrous aluminum chloride to obtain a mixed salt, wherein a molar fraction of the anhydrous sodium chloride, the anhydrous potassium chloride and the anhydrous aluminum chloride are 17.5-25 mol %, 12.5-20 mol % and 57.5-68.5 mol % respectively, grinding the mixed salt thoroughly and transferring into a reaction tube and sealing, heating the reaction tube to 120-150° C. until the mixed salt is completely melted into a clear and transparent liquid, cooling the reaction tube to a room temperature until the clear and transparent liquid re-solidifies into a solid, grinding the solid into powder to obtain molten salt catalyst 1; and S12, mixing the molten salt catalyst 1 with pulverized polyolefin plastics in a mass ratio of (1-10):1 to obtain a mixture, adding $KHCO_3$ to the mixture with an addition amount within a range of 2.5-20 wt % of a mass of the mixed salt, heating the mixture to 90-100° C., maintaining the temperature until the polyolefin plastics are fully degraded, and recovering the molten salt catalyst 1 after the mixture is cooled to the room temperature; or S21, mixing the anhydrous sodium chloride, the anhydrous potassium chloride and the anhydrous aluminum chloride to obtain the mixed salt, wherein a molar fraction of the anhydrous sodium chloride, the anhydrous potassium chloride and the anhydrous aluminum chloride in the mixed salt are 17.5-25 mol %, 12.5-20 mol % and 57.5-68.5 mol % respectively, adding $KHCO_3$ to the mixed salt and grinding thoroughly, and transferring into a reaction tube and sealing, wherein an addition amount of $KHCO_3$ is within a range of 2.5-20 wt % of the mass of the mixed salt, heating the reaction tube to 120-150° C. until the mixed salt with $KHCO_3$ added is completely melted into a clear and transparent liquid, cooling the reaction tube to the room temperature until the clear and transparent liquid re-solidifies into a solid, grinding the solid into powder to prepare molten salt catalyst 2; and S22, mixing the molten salt catalyst 2 with the pulverized polyolefin plastics in a, mass ratio of (1-10):1 to obtain a mixture, heating the mixture to 90-100° C., maintaining the temperature until the polyolefin plastics are fully degraded, and recovering the molten salt catalyst 2 after the mixture is cooled to the room temperature.

BRIEF DESCRIPTION OF THE DRAWINGS

The present disclosure will be further illustrated by way of exemplary embodiments, which will be described in detail through the accompanying drawings.

DETAILED DESCRIPTION

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor.

One or more embodiments of the present disclosure provide a method of catalyzing the degradation of polyolefin plastics with high efficiency, high selectivity, low cost and low energy consumption. Highly efficient catalytic degradation of the polyolefin plastics at a temperature below 100° C. is achieved by adjusting the catalyst composition and properties.

Embodiments of the present disclosure provide a method for catalytically degrading polyolefin plastics at low temperatures, comprising: S11. mixing anhydrous sodium chloride, anhydrous potassium chloride and anhydrous aluminum chloride to obtain a mixed salt, wherein a molar fraction of the anhydrous sodium chloride, the anhydrous potassium chloride and the anhydrous aluminum chloride are 17.5-25 mol %, 12.5-20 mol % and 57.5-68.5 mol % respectively, grinding the mixed salt thoroughly and transferring into a reaction tube and sealing, heating the reaction tube to 120-150° C. until the mixed salt is completely melted into a clear and transparent liquid, cooling the reaction tube to a room temperature until the clear and transparent liquid re-solidifies into a solid, grinding the solid into powder to obtain molten salt catalyst 1.

In some embodiments, the molar fraction of the anhydrous sodium chloride, the anhydrous potassium chloride, and the anhydrous aluminum chloride in step S11 are 17.5-25 mol %, 12.5-20 mol %, and 57.5-68.5 mol %, respectively.

In some embodiments, the molar fraction of the anhydrous sodium chloride, the anhydrous potassium chloride, and the anhydrous aluminum chloride in step S11 are 20 mol %, 16.5 mol %, and 63.5 mol %, respectively.

In some embodiments, the molar fraction of the anhydrous sodium chloride, the anhydrous potassium chloride, and the anhydrous aluminum chloride in step S11 are 17.5 mol %, 20 mol %, and 62.5 mol %, respectively.

In some embodiments, the molar fraction of the anhydrous sodium chloride, the anhydrous potassium chloride, and the anhydrous aluminum chloride in step S11 are 25 mol %, 12.5 mol %, and 62.5 mol %, respectively.

In some embodiments, the molar fraction of the anhydrous sodium chloride, the anhydrous potassium chloride, and the anhydrous aluminum chloride in step S11 are 25 mol %, 17.5 mol %, and 57.5 mol %, respectively.

In some embodiments, the molar fraction of the anhydrous sodium chloride, the anhydrous potassium chloride, and the anhydrous aluminum chloride in step S11 are 19 mol %, 12.5 mol %, and 68.5 mol %, respectively.

In some embodiments, the molar fraction of the anhydrous sodium chloride, the anhydrous potassium chloride, and the anhydrous aluminum chloride in step S11 are 20 mol %, 20 mol %, and 60 mol %, respectively.

In some embodiments, in step S11, the mixed salt is grinded thoroughly and transferred into a reaction tube and sealed, heated the reaction tube to 120-150° C. until the mixed salt is completely melted into a clear and transparent liquid.

In some embodiments, in step S11, the mixed salt is grinded thoroughly and transferred into a reaction tube and sealed, heated the reaction tube to 120° C., 130° C., or 150° C. until the mixed salt is completely melted into a clear and transparent liquid.

In some embodiments, the molten salt catalyst 1 in step S11 is prepared in a protective atmosphere of Ar or $N_2$.

In some embodiments, the particle sizes of the molten salt catalyst 1 in step S11 are within a range of 5-5000 μm.

S12. mixing the molten salt catalyst 1 with pulverized polyolefin plastics in a mass ratio of (1-10):1 to obtain a mixture, adding $KHCO_3$ to the mixture with an addition amount within a range of 2.5-20 wt % of a mass of the mixed salt, heating the mixture to 90-100° C., maintaining the temperature until the polyolefin plastics are fully degraded, and recovering the molten salt catalyst 1 after the mixture is cooled to the room temperature.

In some embodiments, the particle sizes of the pulverized polyolefin plastics in step S12 are within a range of 5-5000 μm.

In some embodiments, the molten salt catalyst 1 in step S12 is mixed with the pulverized polyolefin plastics in a mass ratio of (1-10):1 to obtain a mixture.

In some embodiments, the molten salt catalyst 1 in step S12 is mixed with the pulverized polyolefin plastics in a mass ratio of 10:1, 1:1, or 5:1 to obtain a mixture.

In some embodiments, in step S12, the pulverized polyolefin plastics include high-density polyethylene (HDPE) plastics raw material particles, polypropylene (PP) plastic raw material particles, HDPE plastic recycled particles or PP plastic recycled particles.

In some embodiments, the addition amount of $KHCO_3$ in step S12 is within a range of 2.5-20 wt % of the mass of the mixed salt, heating the mixture to 90-100° C., maintaining the temperature until the polyolefin plastics are fully degraded In some embodiments, the addition amount of $KHCO_3$ in step S12 is 5 wt % of the mass of the mixed salt, heating the mixture to 95° C., maintaining the temperature until the polyolefin plastics are fully degraded In some embodiments, the addition amount of $KHCO_3$ in step S12 is within a range of 2.5 wt % of the mass of the mixed salt, heating the mixture to 95° C., maintaining the temperature until the polyolefin plastics are fully degraded.

In some embodiments, the addition amount of $KHCO_3$ in step S12 is within a range of 20 wt % of the mass of the mixed salt, heating the mixture to 100° C., maintaining the temperature until the polyolefin plastics are fully degraded.

In some embodiments, the addition amount of KHCO₃ in step S12 is within a range of 10 wt % of the mass of the mixed salt, heating the mixture to 90° C., maintaining the temperature until the polyolefin plastics are fully degraded.

In some embodiments, in step S12, a time for maintaining the temperature until the polyolefin plastics are fully degraded is within a range of 0.5-3 h.

In some embodiments, in step S12, a time for maintaining the temperature until the polyolefin plastics are fully degraded is 0.5 h, 2 h, or 3 h.

In some embodiments, gaseous products are colleted during the process of maintaining the temperature until the polyolefin plastics are fully degraded in step S12, wherein the gaseous products include isobutane, isopentane, n-propane, n-butane and n-pentane.

In some embodiments, the recovery of the molten salt catalyst 1 in step S12 comprises: adding an organic solvent to the mixture after the mixture is cooled to the room temperature, stirring the mixture at a temperature of −78° C. to 0° C. to obtain an organic mixture and solid particles after solid-liquid separation, wherein the solid particles are recovered molten salt catalyst 1.

In some embodiments, an organic solvent is added to the mixture after the mixture is cooled to the room temperature, stirring the mixture at a temperature of 0° C., −10° C., −30° C., or −78° C. to obtain an organic mixture and solid particles after solid-liquid separation.

In some embodiments, an alkaline solution or ultrapure water is added to the organic mixture to quench a residual molten salt, wherein the alkaline solution is a 0.2-5 M KOH solution or a 0.2-5 M NaOH solution; and a separated organic phase is filtered with a 0.22 μm PTFE filter membrane to obtain a liquid product containing C9-C14 unsaturated alkanes and C9-C14 cycloalkanes.

In some embodiments, an alkaline solution or ultrapure water is added to the organic mixture to quench a residual molten salt, wherein the alkaline solution is a 1 M, or 5 M KOH solution. In some embodiments, an alkaline solution or ultrapure water is added to the organic mixture to quench a residual molten salt, wherein the alkaline solution is a 0.2 M NaOH solution.

In some embodiments, the organic solvent is one or more of dichloromethane, trichloromethane, diethyl ether and ethyl acetate.

One or more embodiments of the present disclosure provide a method for catalytically degrading polyolefin plastics at low temperatures, comprising: S21. mixing the anhydrous sodium chloride, the anhydrous potassium chloride and the anhydrous aluminum chloride to obtain the mixed salt, wherein a molar fraction of the anhydrous sodium chloride, the anhydrous potassium chloride and the anhydrous aluminum chloride in the mixed salt are 17.5-25 mol %, 12.5-20 mol % and 57.5-68.5 mol % respectively, adding KHCO₃ to the mixed salt and grinding thoroughly, and transferring into a reaction tube and sealing, wherein an addition amount of KHCO₃ is within a range of 2.5-20 wt % of the mass of the mixed salt, heating the reaction tube to 120-150° C. until the mixed salt with KHCO₃ added is completely melted into a clear and transparent liquid, cooling the reaction tube to the room temperature until the clear and transparent liquid re-solidifies into a solid, grinding the solid into powder to prepare molten salt catalyst 2.

In some embodiments, the molar fraction of the anhydrous sodium chloride, the anhydrous potassium chloride, and the anhydrous aluminum chloride in step S21 are 17.5-25 mol %, 12.5-20 mol %, and 57.5-68.5 mol %, respectively.

In some embodiments, the molar fraction of the anhydrous sodium chloride, the anhydrous potassium chloride, and the anhydrous aluminum chloride in step S21 are 20 mol %, 16.5 mol %, and 63.5 mol %, respectively.

In some embodiments, the addition amount of KHCO₃ in step S21 is within a range of 2.5-20 wt % of the mass of the mixed salt, heating the reaction tube to 120-150° C. until the mixed salt with KHCO₃ added is completely melted into a clear and transparent liquid.

In some embodiments, the addition amount of KHCO₃ in step S21 is 5 wt % of the mass of the mixed salt, heating the reaction tube to 120° C. until the mixed salt with KHCO₃ added is completely melted into a clear and transparent liquid.

In some embodiments, the molten salt catalyst 2 in step S21 is prepared in a protective atmosphere of Ar or $N_2$.

In some embodiments, the particle sizes of the molten salt catalyst 2 in step S21 are within a range of 5-5000 μm.

S22. mixing the molten salt catalyst 2 with pulverized polyolefin plastics in a mass ratio of (1-10):1, heating the mixture to 90-100° C., maintaining the temperature until the polyolefin plastics are fully degraded, and recovering the molten salt catalyst 2 after the mixture is cooled to the room temperature.

In some embodiments, the polyolefin plastic after pulverization in step S22 has a particle size of 5-5000 μm.

In some embodiments, the molten salt catalyst 2 in step S22 is mixed with the pulverized polyolefin plastic in a mass ratio of (1-10):1 to obtain a mixture, heated the mixture to 90-100° C., maintaining the temperature until the polyolefin plastics are fully degraded.

In some embodiments, the molten salt catalyst 2 in step S22 is mixed with the pulverized polyolefin plastic in a mass ratio of 10:1 to obtain a mixture, heating the mixture to 95° C., maintaining the temperature until the polyolefin plastics are fully degraded.

In some embodiments, in step S22, the pulverized polyolefin plastics are the HDPE plastic raw material particles, the PP plastic raw material particles, the HDPE plastic recycled particles or the PP plastic recycled particles.

In some embodiments, in step S22, a time for maintaining the temperature until the polyolefin plastics are fully degraded is within a range of 0.5-3 h.

In some embodiments, in step S22, a time for maintaining the temperature until the polyolefin plastics are fully degraded is 3 h.

In some embodiments, gaseous products are collected during the process of maintaining the temperature until the polyolefin plastics are fully degraded in step S22, wherein the gaseous products include isobutane, isopentane, n-propane, n-butane and n-pentane.

In some embodiments, the recovery of the molten salt catalyst 2 in step S22 comprises: adding an organic solvent to the mixture after the mixture is cooled to the room temperature, stirring the mixture at a temperature of −78° C. to 0° C. to obtain an organic mixture and solid particles after solid-liquid separation, wherein the solid particles are the recovered molten salt catalyst 2.

In some embodiments, the organic solvent is added to the mixture after the mixture is cooled to room temperature, stirring the mixture at a temperature of −10° C. to obtain an organic mixture and solid particles after solid-liquid separation.

In some embodiments, the alkaline solution or ultrapure water is added to the organic mixture to quench a residual molten salt, wherein alkaline solution is a 0.2-5 M KOH solution or a 0.2-5 M NaOH solution, and an organic phase is filtered with a 0.22 μm PTFE filter membrane to obtain a liquid product containing C9-C14 unsaturated alkanes and C9-C14 cycloalkanes.

In some embodiments, the alkaline solution or ultrapure water is added to the organic mixture to quench the residual molten salt, wherein the alkaline solution is a 1 M KOH solution.

In some embodiments, the organic solvent is one or more of dichloromethane, trichloromethane, diethyl ether and ethyl acetate.

Embodiments of the present disclosure have at least the following beneficial effects:

(1) In the embodiment of the present disclosure, a mass-produced molten salt catalyst is adopted and utilized for catalyzing the degradation of the polyolefin plastics. In the present disclosure, the anhydrous sodium chloride, the anhydrous potassium chloride, and the anhydrous aluminum chloride are employed as raw materials, and mixed, ground, sealed, and melted into a clear and transparent liquid at a high temperature, cooled to room temperature, and re-solidified into a solid. The solid is then taken out and ground into powder to obtain a molten salt catalyst with high catalytic activity. Due to the inherent highly polar reaction environment of inorganic molten salts, the standard chemical potential and reactivity of non-ionic reactants such as polyolefins can be greatly increased, the carbocation transition state is further stabilized. Consequently, the total free energy barrier of the C—C bond cleavage reaction is reduced, and the thermodynamic and kinetic reactivity of the catalytic cracking of polyolefins is markedly improved. The degradation and upgrading of the polyolefin plastics is accomplished by mixing the molten salt catalyst with the pulverized polyolefin plastics and then adding the additive $KHCO_3$, and heating for a period of time. The technical principle is that the electrophilic effect of the highly active chloroaluminate in the molten salt reacts with the polyolefin to form carbocations, and the carbocations form $C_3$-$C_5$ gaseous alkanes mainly composed of isobutane and a small amount of cyclic liquid cracking products of adamantane through hydrogen transfer reactions, isomerization, and cyclization reactions. The additive $KHCO_3$ regulates the composition of the Lewis acid sites of the chloroaluminate, facilitating the catalytic cracking of polyolefins, and ultimately leading to a nearly 100% mass conversion rate of polyolefins. The content of the obtained gaseous products is qualitatively and quantitatively determined by gas chromatography, and the mass conversion rate of the gaseous products exceeds 90%. The mass of the liquid product is evaluated by a thermogravimetric analyzer, and the specific structure of the product is analyzed by a gas chromatography-mass spectrometer. Finally, the mass conversion rate of the liquid product is obtained as 7%-14%, mainly containing $C_9$-$C_{14}$ unsaturated alkanes and $C_9$-$C_{14}$ cycloalkanes.

In the embodiment of the present disclosure, the additive $KHCO_3$ is mixed with the anhydrous sodium chloride, the anhydrous potassium chloride, and the anhydrous aluminum chloride to obtain the molten salt catalyst, and the obtained molten salt catalyst is directly mixed with the pulverized polyolefin plastics and heated for reaction. The same technical effect of degrading polyolefin plastics can be achieved.

(2) In the method for catalytically degrading polyolefin plastics at low temperatures provided by embodiments of the present disclosure, the low-temperature molten salt, as a liquid catalyst and solvent, can effectively increase the contact between the catalytic sites and the plastic, and the high ionic environment of the molten salt well stabilizes the carbocations of the reaction and accelerates the mass transfer process, thereby effectively improving the catalytic efficiency and selectivity. The mass recovery rate of the degradation and upgrading of polyolefin plastics exceeds 99%. No solvents, initiators, or phase-transfer agents are required to be added during the reaction process, and the degradation temperature is lower than 100° C., significantly reducing energy consumption and costs. The recovered molten salt catalyst can be reused for the low-temperature catalytic degradation of the polyolefin plastics and the mass conversion of the molten salt catalyst reaches more than 97% after five cycles. The raw materials used in the method for catalytically degrading polyolefin plastics at low temperatures provided by the embodiments of the present disclosure are inexpensive and readily accessible, which substantially reduce the cost of the catalyst, and at the same time, the preparation method is straightforward and conducive to achieving mass production.

The experimental techniques in the following examples, unless otherwise specified, are conventional techniques. The test materials used in the following examples, unless otherwise specified, are obtained from standard biochemical reagent companies. Quantitative assays in the following examples are performed with three replicate experiments, and the results are averaged.

EXAMPLES

Example 1

The present embodiment provides a method for catalytically degrading polyolefin plastics at low temperatures, comprising:

S1. anhydrous sodium chloride, anhydrous potassium chloride and anhydrous aluminum chloride were mixed to obtain a mixed salt, wherein a molar fraction of the anhydrous sodium chloride, the anhydrous potassium chloride and the anhydrous aluminum chloride were 20 mol %, 16.5 mol % and 63.5 mol % respectively, the mixed salt was ground thoroughly and transferred into a reaction tube and sealed, heated to 120° C. and maintained, stop heating when the mixed salt was completely melted into a clear and transparent liquid, cooled naturally to room temperature until the clear and transparent liquid re-solidified into a solid, the solid was token out and ground into powder to prepare molten salt catalyst 1 with a particle size of 5-5000 μm.

S2. the molten salt catalyst 1 was mixed with pulverized HDPE plastic raw material particles with a particle size of 5-5000 μm (from McLean Chemical Reagent Co., Ltd., melt index: 6~9 g/10 min) in a mass ratio of 10:1, and $KHCO_3$ was added with an addition amount of 5 wt % of a mass of the mixed salt, heated and stirred until the temperature rises to 95° C. and maintained 3 h. The polyolefin plastics were fully degraded.

The gaseous products throughout the degradation process were collected. When the reaction was finished and cooled to room temperature, an organic solvent, such as trichloromethane, was introduced into the reaction system, and placed at −10° C. to perform the solid-liquid separation. By means of multiple extractions, an organic mixture and solid particles were obtained, and the solid particles were recovered molten salt catalyst 1.

The organic mixture was placed at −10° C., 1 M of KOH solution was added to the organic mixture to quench the residual molten salts, and the organic phase was separated out by a separatory funnel and filtered with a 0.22 μm PTFE filter membrane to obtain a liquid product.

Example 2

The present embodiment provides a method for catalytically degrading polyolefin plastics at low temperatures, comprising:
- S1. anhydrous sodium chloride, anhydrous potassium chloride and anhydrous aluminum chloride were mixed to obtain a mixed salt, wherein a molar fraction of the anhydrous sodium chloride, the anhydrous potassium chloride and the anhydrous aluminum chloride were 20 mol %, 16.5 mol % and 63.5 mol % respectively, $KHCO_3$ was added to the mixed salt and grinding thoroughly, and transferred into a reaction tube and sealing, wherein an addition amount of $KHCO_3$ was 5 wt % of the mass of the mixed salt, heated to 120-150° C. and maintained, stop heating when the mixed salt was completely melted into a clear and transparent liquid, cooled naturally to room temperature until the clear and transparent liquid re-solidified into a solid, the solid was token out and ground into powder to prepare molten salt catalyst 2 with a particle size of 5-5000 μm.
- S2. the molten salt catalyst 2 was mixed with pulverized HDPE plastic raw material particles with a particle size of 5-5000 μm (from McLean Chemical Reagent Co., Ltd., melt index: 6~9 g/10 min) in a mass ratio of 10:1, heated and stirred until the temperature rises to 95° C. and maintained 3 h. The polyolefin plastics were fully degraded.

The gaseous products throughout the degradation process were collected. When the reaction was finished and cooled to room temperature, an organic solvent, such as trichloromethane, was introduced into the reaction system, and placed at −10° C. to perform the solid-liquid separation. By means of multiple extractions, an organic mixture and solid particles were obtained, and the solid particles were the recovered molten salt catalyst 2.

The organic mixture was placed at −10° C., 1 M of KOH solution was added to the organic mixture to quench the residual molten salts, and the organic phase was separated out by a separatory funnel and filtered with a 0.22 μm PTFE filter membrane to obtain a liquid product.

Example 3

The present embodiment provides a method for catalytically degrading polyolefin plastics at low temperatures, the specific steps of which were referred to in Example 1. The difference was only that the polyolefin plastic in Step S2 was PP plastic raw material particles (from Maclean's Chemical Reagent Co. Ltd., melt index: 0.5 g/10 min; particle size: 3-5 mm).

Example 4

The present embodiment provides a method for catalytically degrading polyolefin plastics at low temperatures, the specific steps of which were referred to in Example 1. The difference was only that the polyolefin plastic in Step S2 was the HDPE plastic recycled particles (which is obtained by washing, drying, and shearing HDPE pharmaceutical bottles, with length and width sizes ranging from 1 mm*1 mm to 5 mm*5 mm).

Example 5

The present embodiment provides a method for catalytically degrading polyolefin plastics at low temperatures, the specific steps of which were referred to in Example 1. The difference was only that the polyolefin plastic in Step S2 was the PP plastic recycled particles (which is obtained by washing, drying, and shearing PP beverage bottles, with length and width sizes in the range of 1 mm*1 mm to 5 mm*5 mm).

Example 6

The present embodiment provides a method for catalytically degrading polyolefin plastics at low temperatures, comprising:
- S1. anhydrous sodium chloride, anhydrous potassium chloride and anhydrous aluminum chloride were mixed to obtain a mixed salt, wherein a molar fraction of the anhydrous sodium chloride, the anhydrous potassium chloride and the anhydrous aluminum chloride were 17.5 mol %, 20 mol % and 62.5 mol %, respectively, the mixed salt was ground thoroughly and transferred into a reaction tube and sealed, heated to 130° C. and maintained, stop heating when the mixed salt was completely melted into a clear and transparent liquid, cooled naturally to room temperature where the clear and transparent liquid re-solidified into a solid, the solid was token out and ground into powder to prepare molten salt catalyst 1 with a particle size of 5-5000 μm.
- S2. the molten salt catalyst 1 was mixed with pulverized HDPE plastic raw material particles with a particle size of 5-5000 μm (from McLean Chemical Reagent Co., Ltd., melt index: 6~9 g/10 min) in a mass ratio of 10:1, and $KHCO_3$ was added with an addition amount of 2.5 wt % of a mass of the mixed salt, heated and stirred until the temperature rises to 95° C. and maintained 2 h. The polyolefin plastics were fully degraded.

The gaseous products throughout the degradation process were collected. When the reaction was finished and cooled to room temperature, an organic solvent, such as trichloromethane, was introduced into the reaction system, and placed at −78° C. to perform the solid-liquid separation, and an organic mixture and solid particles were obtained, and the solid particles were recovered molten salt catalyst 1.

The organic mixture was placed at −78° C., 0.2 M of NaOH solution was added to the organic mixture to quench the residual molten salts, and the organic phase was separated out by a separatory funnel and filtered with a 0.22 μm PTFE filter membrane to obtain a liquid product.

Example 7

The present embodiment provides a method for catalytically degrading polyolefin plastics at low temperatures, comprising:
- S1. anhydrous sodium chloride, anhydrous potassium chloride and anhydrous aluminum chloride were mixed to obtain a mixed salt, wherein a molar fraction of the anhydrous sodium chloride, the anhydrous potassium chloride and the anhydrous aluminum chloride were 25 mol %, 12.5 mol % and 62.5 mol %, respectively, the mixed salt was ground thoroughly and transferred into a reaction tube and sealed, heated to 120° C. and maintained, stop heating when the mixed salt was completely melted into a clear and transparent liquid, cooled naturally to room temperature until the clear and transparent liquid re-solidified into a solid, the solid was token out and ground into powder to prepare molten salt catalyst 1 with a particle size of 5-5000 μm.

S2. the molten salt catalyst 1 was mixed with pulverized HDPE plastic raw material particles with a particle size of 5-5000 μm (from McLean Chemical Reagent Co., Ltd., melt index: 6~9 g/10 min) in a mass ratio of 10:1, and $KHCO_3$ was added with an addition amount of 20 wt % of a mass of the mixed salt, heated and stirred until the temperature rises to 100° C. and maintained 0.5 h. The polyolefin plastics were fully degraded.

The gaseous products throughout the degradation process were collected. When the reaction was finished and cooled to room temperature, an organic solvent, such as trichloromethane, was introduced into the reaction system, and placed at 0° C. to perform the solid-liquid separation, and an organic mixture and solid particles were obtained, and the solid particles were recovered molten salt catalyst 1.

The organic mixture was placed at 0° C., 1M of KOH solution was added to the organic mixture to quench the residual molten salts, and the organic phase was separated out by a separatory funnel and filtered with a 0.22 μm PTFE filter membrane to obtain a liquid product.

Example 8

The present embodiment provides a method for catalytically degrading polyolefin plastics at low temperatures, comprising:
S1. anhydrous sodium chloride, anhydrous potassium chloride and anhydrous aluminum chloride were mixed to obtain a mixed salt, wherein a molar fraction of the anhydrous sodium chloride, the anhydrous potassium chloride and the anhydrous aluminum chloride were 25 mol %, 17.5 mol % and 57.5 mol %, respectively, the mixed salt was ground thoroughly and transferred into a reaction tube and sealed, heated to 150° C. and maintained, stop heating when the mixed salt was completely melted into a clear and transparent liquid, cooled naturally to room temperature until the clear and transparent liquid re-solidified into a solid, the solid was token out and ground into powder to prepare molten salt catalyst 1 with a particle size of 5-5000 μm.
S2. the molten salt catalyst 1 was mixed with pulverized HDPE plastic raw material pelltes with a particle size of 5-5000 μm (from McLean Chemical Reagent Co., Ltd., melt index: 6~9 g/10 min) in a mass ratio of 5:1, and $KHCO_3$ was added with an addition amount of 10 wt % of a mass of the mixed salt, heated and stirred until the temperature rises to 90° C. and maintained 3 h. The polyolefin plastics were fully degraded.

The gaseous products throughout the degradation process were collected. When the reaction was finished and cooled to room temperature, an organic solvent, such as trichloromethane, was introduced into the reaction system, and placed at −30° C. to perform the solid-liquid separation, and an organic mixture and solid particles were obtained, and the solid particles were recovered molten salt catalyst 1.

The organic mixture was placed at −30° C., 5 M of KOH solution was added to the organic mixture to quench the residual molten salts, and the organic phase was separated out by a separatory funnel and filtered with a 0.22 μm PTFE filter membrane to obtain a liquid product.

Example 9

The present embodiment provides a method for catalytically degrading polyolefin plastics at low temperatures, the specific steps of which were referred to in Example 8. The difference was only that the molar fractions of anhydrous sodium chloride, anhydrous potassium chloride, and anhydrous aluminum chloride in the mixed salt of Step S1 are respectively 19 mol %, 12.5 mol % and 68.5 mol %.

Example 10

The present embodiment provides a method for catalytically degrading polyolefin plastics at low temperatures, the specific steps of which were referred to in Example 8. The difference was only that the molar fractions of anhydrous sodium chloride, anhydrous potassium chloride, and anhydrous aluminum chloride in the mixed salt of Step S1 are respectively 20 mol %, 20 mol % and 60 mol %.

Comparative Example 1

The present embodiment provides a method for catalytically degrading polyolefin plastics at low temperatures, the specific steps of which were referred to in Example 1. The difference was only that $KHCO_3$ is not added in step S2.

Comparative Example 2

The present embodiment provides a method for catalytically degrading polyolefin plastics at low temperatures, the specific steps of which were referred to in Example 3. The difference was only that $KHCO_3$ is not added in step S2.

The mass recovery rates of Examples 1-10 and Comparative Examples 1-2 were tested by weighing the plastic before and after the reaction. After testing, the mass conversion rate of Example 1 was 100%, that of Example 2 was 100%, that of Example 3 was 100%, that of Example 4 was 100%, that of Example 5 was 100%, that of Example 6 was 98.8%, that of Example 7 was 99.2%, that of Example 8 was 95.6%, that of Example 9 was 99.8%, that of Example 10 was 99.6%, the mass conversion rate of Comparative Example 1 was 66%, and that of Comparative Example 2 was 56%. From the test data of the mass conversion rates of the above Examples 1-10 and Comparative Examples 1-2, it can be known that when the additive $KHCO_3$ is not added, the mass conversion rate of the degradation of the polyolefin plastics by the sole molten salt catalyst is relatively low. The addition of the additive $KHCO_3$ into the molten salt can significantly increase the mass conversion rate of the catalytic upgrading of the polyolefin plastics by the molten salt, reaching a mass conversion rate of 100%.

Figure 1:
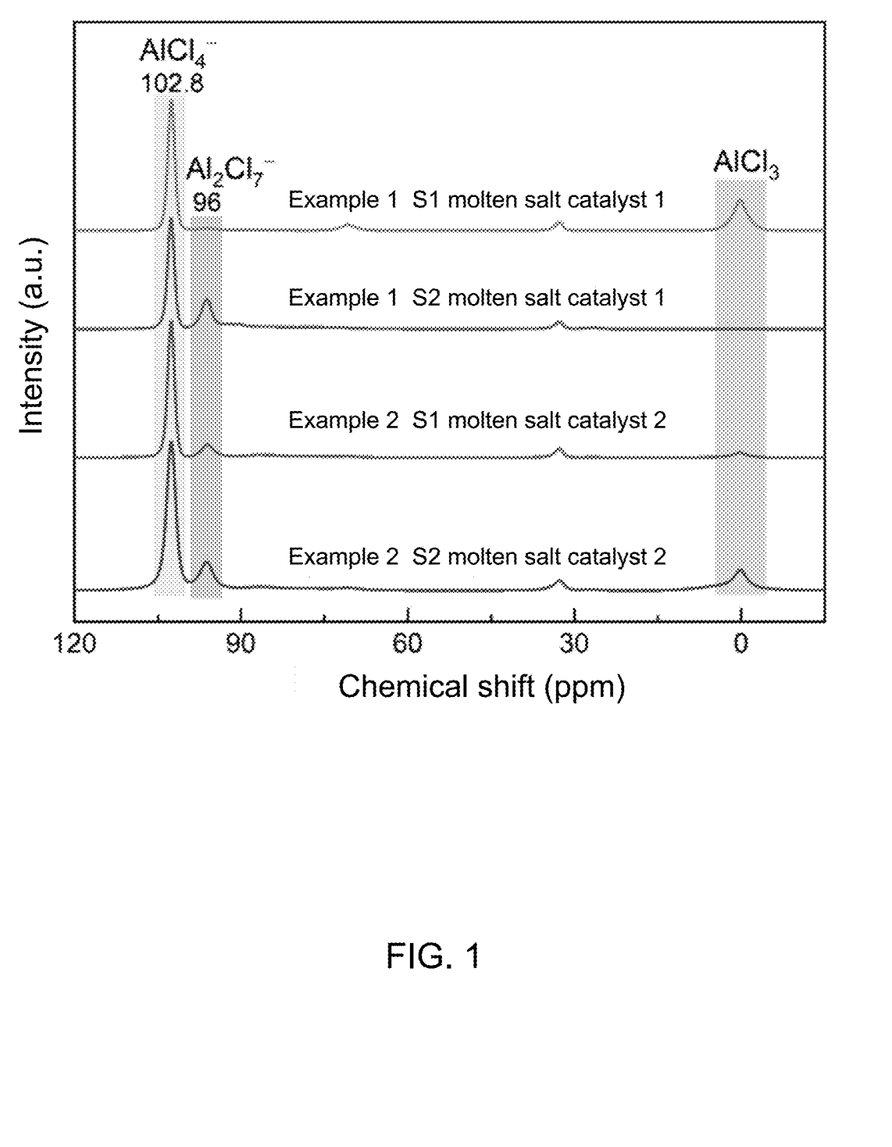
FIG. 1 is a solid-state nuclear magnetic resonance (NMR) spectrogram of molten salt catalysts and recovered molten salt catalysts according to some embodiments of the present disclosure.

FIG. 1 is a solid-state nuclear magnetic resonance (NMR) spectrogram of molten salt catalysts and recovered molten salt catalysts according to some embodiments (Examples 1-2) of the present disclosure. As can be seen from FIG. 1, the main components of the molten salt catalyst 1 prepared in step S1 of Example 1 are $AlCl_4^-$ salt and $AlCl_3$, and the content of $Al_2Cl_7^-$ is extremely low. In the molten state, there are multiple possible forms of inorganic chloroaluminate (i.e., $Al_nCl_{3n+1}$, n≥1), and adjusting the components of the molten salt has a significant impact on the form of inorganic chloroaluminate, among which the $Al_2Cl_7^-$ species has high catalytic activity; the addition of $KHCO_3$ in step S2 significantly changes the composition and form of the molten salt catalyst, and the main components of the recovered molten salt catalyst 1 are $AlCl_4^-$, $AlCl_3$, and $Al_2Cl_7^-$, among which the content of $Al_2Cl_7^-$ with high catalytic activity significantly increases, which can improve the mass recovery rate of polyolefin plastics. When $KHCO_3$ is added during the preparation of the molten salt catalyst 2 in Example 2, the content of $Al_2Cl_7^-$ with high catalytic activity in the molten salt catalyst can also be increased, thereby achieving the degradation and upgrading of polyolefin plastics.

Figure 2:
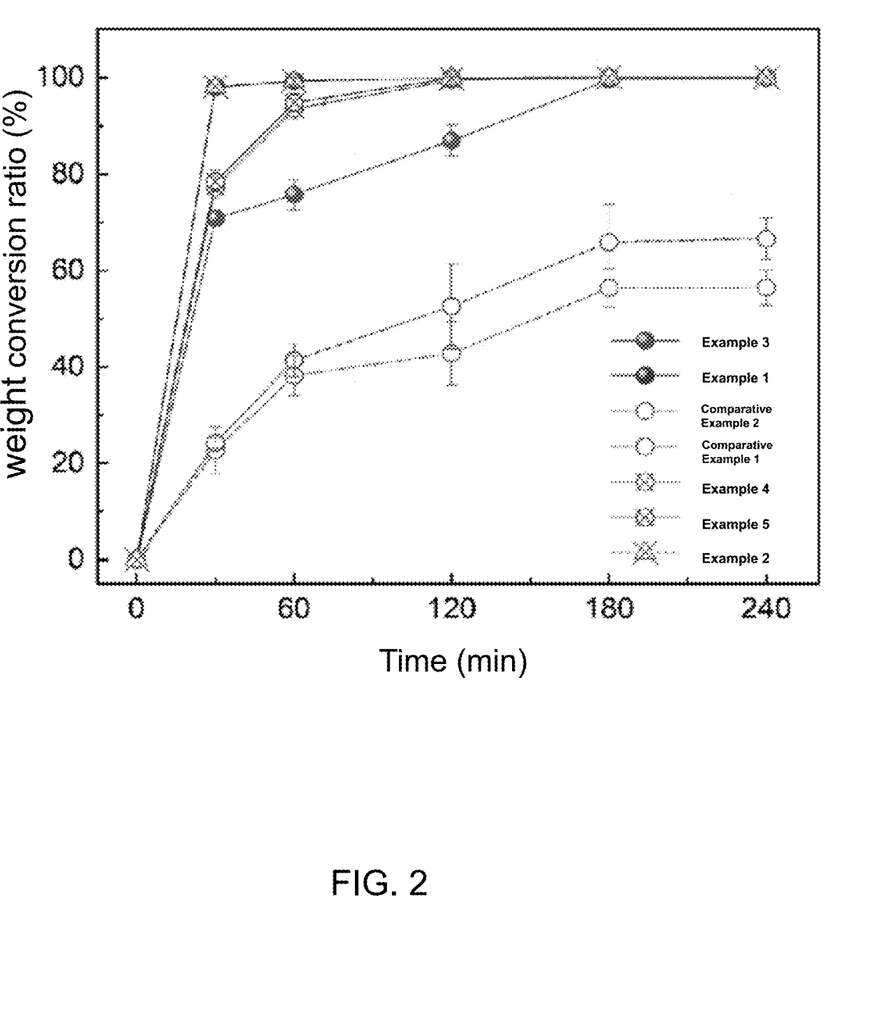
FIG. 2 is a rate curve diagram illustrating the degradation of polyolefin plastics according to some embodiments of the present disclosure.

FIG. 2 is a rate curve diagram illustrating the degradation of polyolefin plastics according to some embodiments (Examples 1-3 and Comparative Examples 1-2) of the present disclosure. It can be known from the degradation rate curves of polyolefin plastics in FIG. 2 that in Comparative Example 1 and Comparative Example 2, without the effect of the additive $KHCO_3$, the mass recovery rate of the molten salt catalyst after reacting at 95° C. for 180 min is between 55% and 66%; whether the molten salt catalyst is first prepared and then the additive $KHCO_3$ is added during the degradation reaction with polyolefin plastic particles in Example 1, or the additive $KHCO_3$ is first added to prepare the molten salt catalyst and then the degradation reaction with polyolefin plastic particles is carried out in Example 2, the mass recovery rate of polyolefin plastics by the both molten salt catalysts can be significantly increased since the two curves overlap. When the molten salt catalyst 1 of Example 1 is combined with $KHCO_3$ for the degradation of HDPE plastic, or when the molten salt catalyst 2 of Example 2 is used for the degradation of HDPE plastic, the equilibrium is reached after 30 min, and the mass recovery rate approaches 100%. Under the action of the molten salt catalyst, the mass recovery rate of the PP plastic in Example 3 rises relatively slowly compared to Example 1, and the reaction tends to equilibrium after 180 min. In addition, the addition of $KHCO_3$ has no obvious effect on the selectivity of the liquid products of the molten salt catalyst for catalyzing HDPE plastic. In Example 4 and Example 5, when $KHCO_3$ is added to the molten salt catalyst, HDPE and PP plastics are rapidly degraded, and the equilibrium is reached after 180 min, and the mass recovery rate approaches 100%.

Figure 3:
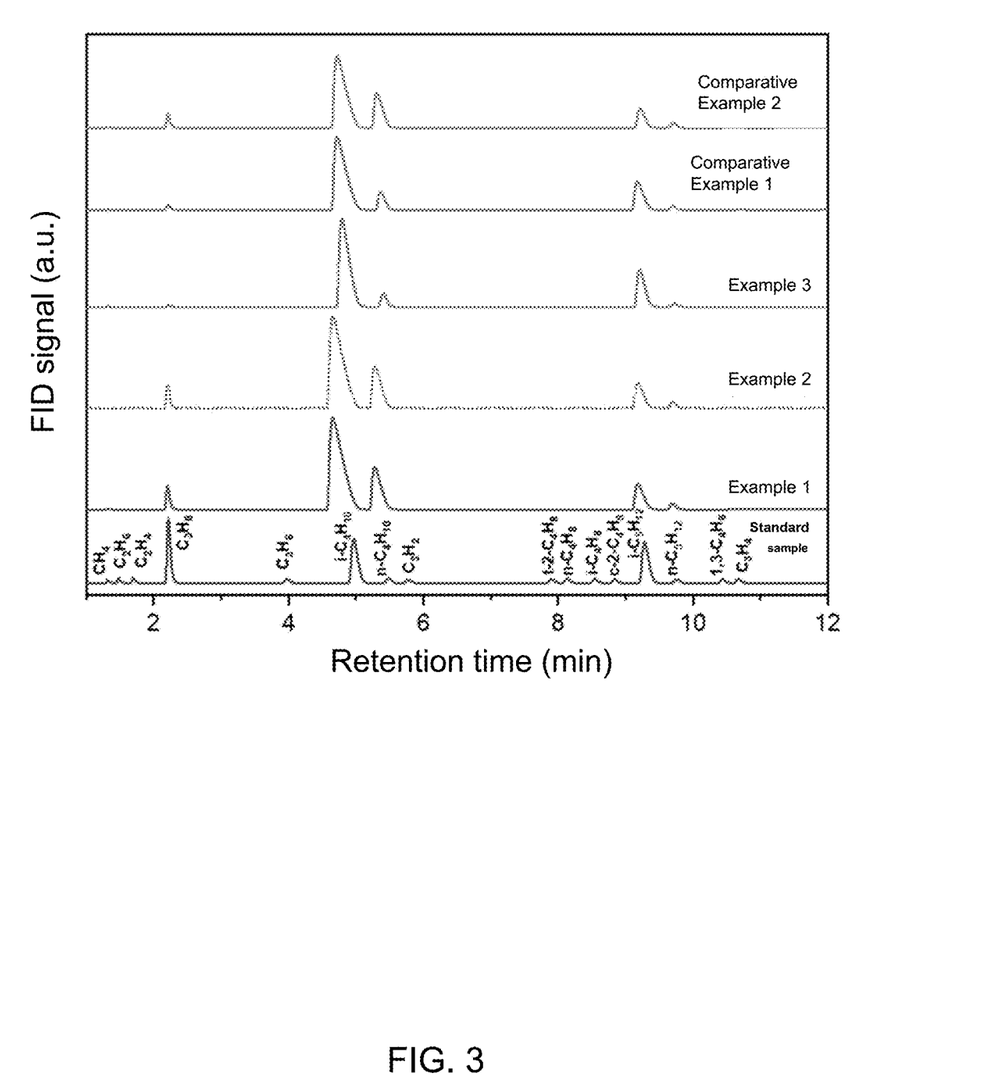
FIG. 3 illustrates a gas chromatogram of gaseous products according to some embodiments of the present disclosure.

FIG. 3 is a gas chromatogram of gaseous products according to some embodiments (Examples 1-3 and Comparative Examples 1-2) of the present disclosure, among which the gas chromatograms of the gaseous products in Example 1 and Example 2 are the same. It can be known from the gas chromatographic analysis results in FIG. 3 that the gaseous products of Examples 1-3 and Comparative Examples 1-2 are mainly isobutane, followed by isopentane, and the selectivity of butane and pentane is more than 90%.

Figure 4:
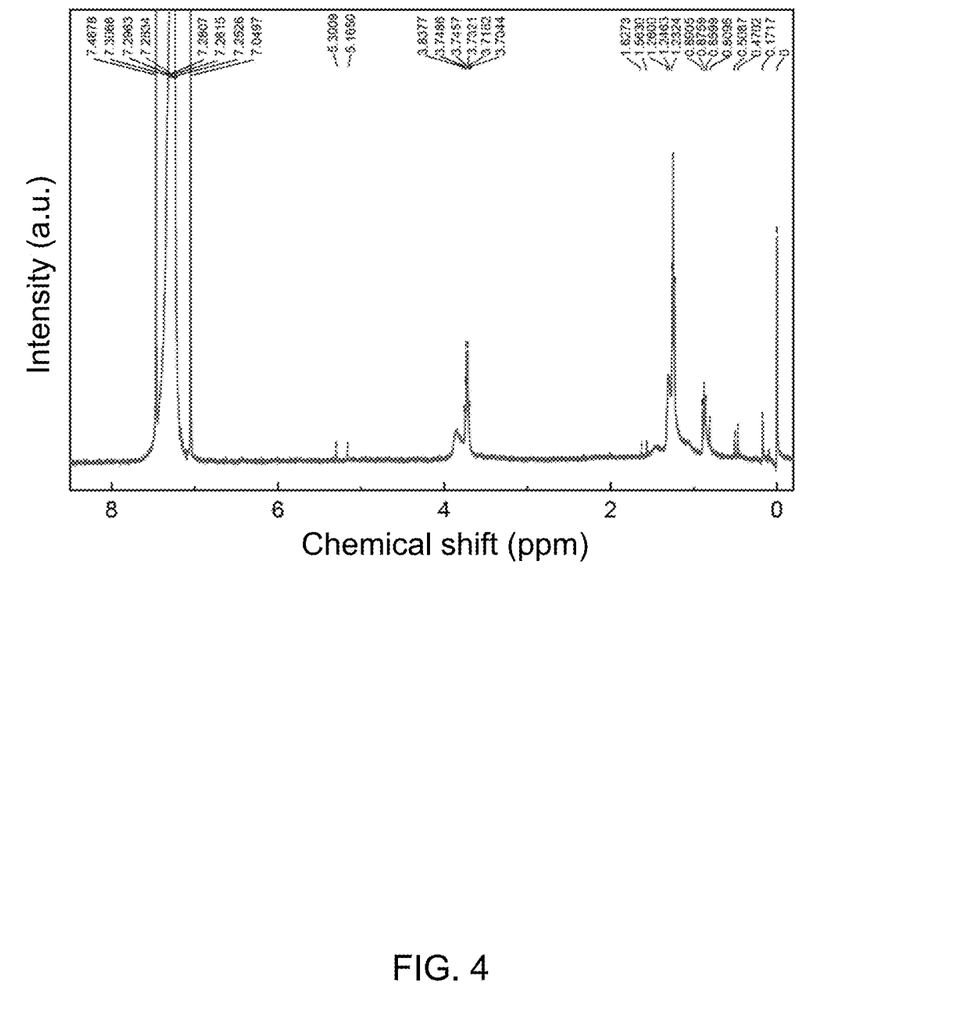
FIG. 4 is a $^1$H spectrum of an NMR spectrogram of a liquid product according to some embodiments of the present disclosure.

FIG. 4 is a $^1H$ spectrum of an NMR spectrogram of a liquid product according to some embodiments (Example 1) of the present disclosure. It can be seen from FIG. 4 that the NMR $^1H$ shows that the liquid product is mainly $C_9$-$C_{14}$ alkanes, and the selectivity is greater than 90%. The selectivity refers to the ratio between the concentration (mass) of $C_9$-$C_{14}$ alkanes generated and the concentration (mass) of the plastic reactant, and the data are mainly obtained from gas chromatography-mass spectrometry.

Figure 5:
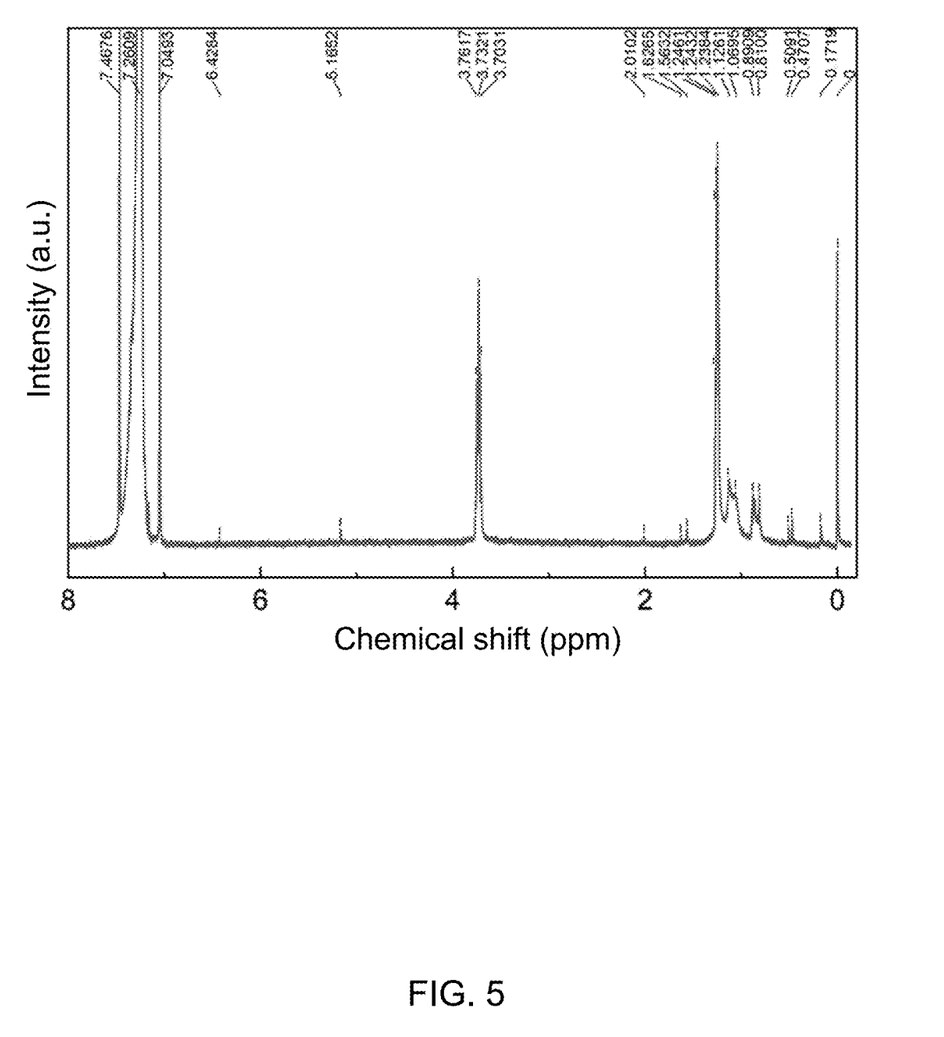
FIG. 5 is another $^1$H spectrum of an NMR spectrogram of a liquid product according to some embodiments of the present disclosure.

FIG. 5 is another 1H spectrum of an NMR spectrogram of a liquid product according to some embodiments (Example 3) of the present disclosure. It can be seen from FIG. 5 that the NMR $^1H$ shows that the liquid product is mainly $C_9$-$C_{14}$ alkanes, and the selectivity is greater than 90%.

Figure 6:
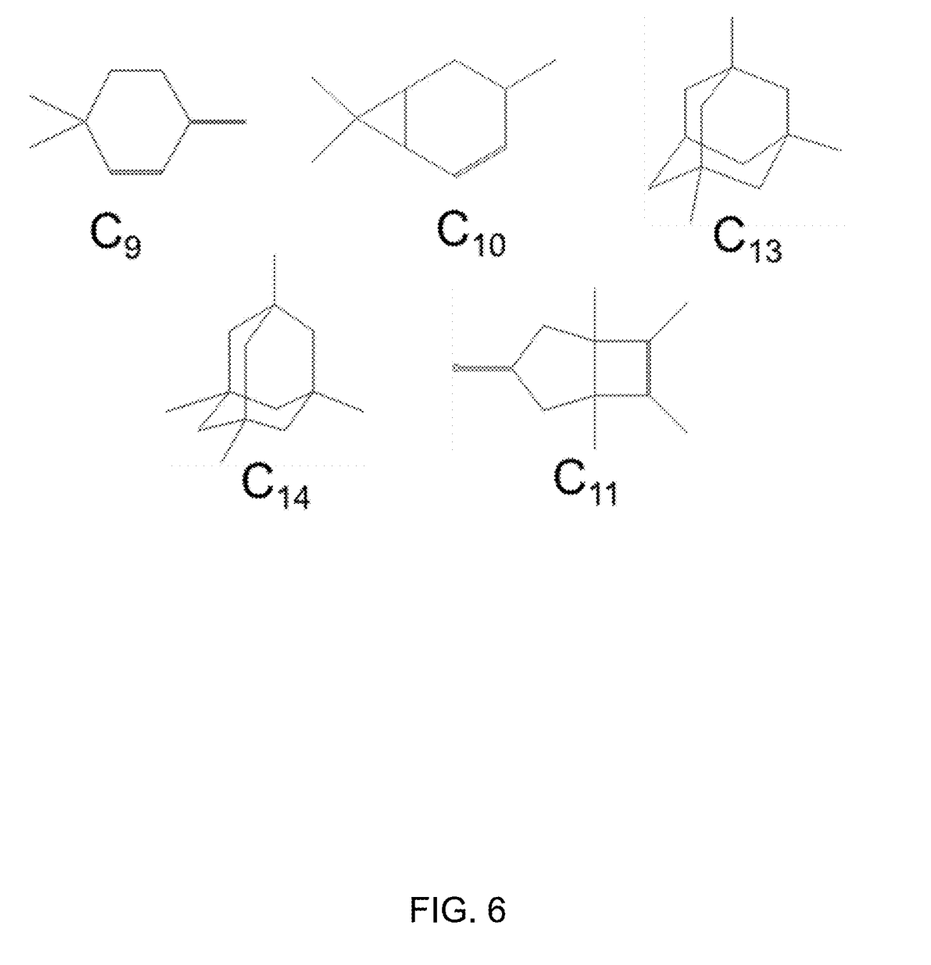
FIG. 6 is a structural diagram illustrating liquid products according to some embodiments of the present disclosure.

FIG. 6 is a structural diagram illustrating liquid products according to some embodiments (Examples 1-5 and Comparative Examples 1-2) of the present disclosure. The mass recovery rate of the liquid products is 7%-14% obtained by the sum of the masses of the individual structures measured by the internal standard method is 7%-14%, the selectivity is greater than 90%, and the liquid product consists of $C_9$-$C_{14}$ unsaturated alkanes and $C_9$-$C_{14}$ cycloalkanes. Specifically, the mass recovery rates of the liquid products in Example 1 and Example 2 are 7%, the mass recovery rate of the liquid products in Example 3 is 10%, the mass recovery rate of the liquid products in Example 4 and Example 5 is 8.5%, and the mass recovery rates of the liquid products in Comparative Example 1 and Comparative Example 2 are 14% and 13%, respectively.

Figure 7:
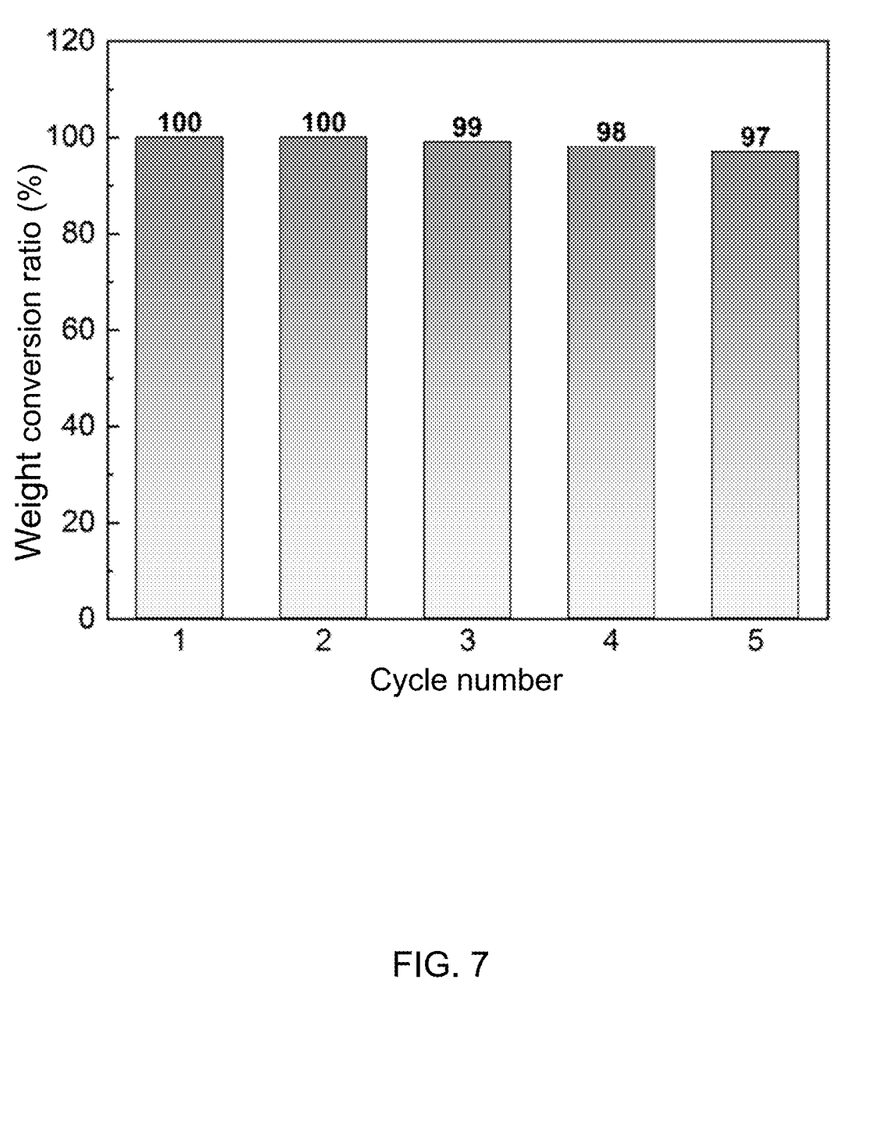
FIG. 7 is a block diagram illustrating the stability of a molten salt catalyst recycled 5 times for low temperature catalytic degradation of polyolefin plastics according to some embodiments of the present disclosure.

The recovered molten salt catalyst 1 from Example 1 was recycled for the low-temperature catalytic degradation of polyolefin plastics. The specific steps were referred to Example 1. The difference is that when the recovered molten salt catalyst 1 is recycled for the low-temperature catalytic degradation of the polyolefin plastics, the addition amount of $KHCO_3$ is only 1 wt % of the mass of the molten salt catalyst 1. The stability of the molten salt catalyst of Example 1 recycled 5 times is shown in FIG. 7. It can be seen from FIG. 7 that in the stability test of the molten salt catalyst recycled and used for 5 times, the mass conversion rates of the catalytic plastics are all greater than 97%. In addition, a mass conversion rate of the molten salt catalyst recycled 5 times in Example 2 is more than 97.5%, that of the molten salt catalyst recycled 5 times in Example 3 is more than 96.8%, that of the molten salt catalyst recycled 5 times in Example 4 is more than 97.1%, and that of the molten salt catalyst recycled 5 times in Example 5 is more than 97.4%.

The basic concepts have been described above, apparently, in detail, as will be described above, and do not constitute limitations of the disclosure. Although there is no clear explanation here, those skilled in the art may make various modifications, improvements, and modifications of the present disclosure. This type of modification, improvement, and corrections are recommended in the present disclosure, so the modification, improvement, and the amendment remain in the spirit and scope of the exemplary embodiment of the present disclosure.

At the same time, the present disclosure uses specific words to describe the embodiments of the present disclosure. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not limitation, alternative configurations of the embodiments of the present disclosure may be utilized in accordance with the teachings herein. Accordingly, embodiments of the present disclosure are not limited to that precisely as shown and described.

What is claimed is:

1. A method for catalytically degrading polyolefin plastics at a low temperature, comprising:
    S11, mixing anhydrous sodium chloride, anhydrous potassium chloride and anhydrous aluminum chloride to obtain a mixed salt, wherein a molar fraction of the anhydrous sodium chloride, the anhydrous potassium chloride and the anhydrous aluminum chloride are 17.5-25 mol %, 12.5-20 mol % and 57.5-68.5 mol % respectively,
    grinding the mixed salt thoroughly and transferring into a reaction tube and sealing, heating the reaction tube to 120-150° C. until the mixed salt is completely melted into a clear and transparent liquid, cooling the reaction tube to a room temperature until the clear and transparent liquid re-solidifies into a solid, grinding the solid into powder to obtain molten salt catalyst 1; and
    S12, mixing the molten salt catalyst 1 with pulverized polyolefin plastics in a mass ratio of (1-10):1 to obtain a mixture, adding $KHCO_3$ to the mixture with an addition amount within a range of 2.5-20 wt % of a mass of the mixed salt, heating the mixture to 90-100° C., maintaining the temperature until the polyolefin plastics are fully degraded, and recovering the molten salt catalyst 1 after the mixture is cooled to the room temperature; or
    S21, mixing the anhydrous sodium chloride, the anhydrous potassium chloride and the anhydrous aluminum chloride to obtain the mixed salt, wherein a molar fraction of the anhydrous sodium chloride, the anhydrous potassium chloride and the anhydrous aluminum chloride in the mixed salt are 17.5-25 mol %, 12.5-20 mol % and 57.5-68.5 mol % respectively, adding $KHCO_3$ to the mixed salt and grinding thoroughly, and transferring into a reaction tube and sealing, wherein an addition amount of $KHCO_3$ is within a range of 2.5-20 wt % of the mass of the mixed salt,
    heating the reaction tube to 120-150° C. until the mixed salt with $KHCO_3$ added is completely melted into a clear and transparent liquid, cooling the reaction tube to the room temperature until the clear and transparent liquid re-solidifies into a solid, grinding the solid into powder to prepare molten salt catalyst 2; and
    S22, mixing the molten salt catalyst 2 with the pulverized polyolefin plastics in a, mass ratio of (1-10):1 to obtain a mixture, heating the mixture to 90-100° C., maintaining the temperature until the polyolefin plastics are fully degraded, and recovering the molten salt catalyst 2 after the mixture is cooled to the room temperature.

2. The method of claim 1, wherein the molten salt catalyst 1 in step S11 and the molten salt catalyst 2 in step S21 are prepared in a protective atmosphere of Ar or $N_2$.

3. The method of claim 1, wherein particle sizes of the molten salt catalyst 1 in step S11 and the molten salt catalyst 2 in step S21 are within a range of 5-5000 μm.

4. The method of claim 1, wherein particle sizes of the pulverized polyolefin plastics in step S12 and step S22 are within a range of 5-5000 μm.

5. The method of claim 1, wherein in step S12 and step S22, the pulverized polyolefin plastics are high-density polyethylene (HDPE) plastic raw material particles, polypropylene (PP) plastic raw material particles, HDPE plastic recycled particles or PP plastic recycled particles.

6. The method of claim 1, wherein in step S12 and step S22, a time for maintaining the temperature until the polyolefin plastics are fully degraded is within a range of 0.5-3 h.

7. The method of claim 1, further comprising collecting gaseous products during the process of maintaining the temperature until the polyolefin plastics are fully degraded in step S12 and step S22, wherein the gaseous products include isobutane, isopentane, n-propane, n-butane and n-pentane.

8. The method of claim 1, wherein the recovery of the molten salt catalyst 1 in step S12 or the molten salt catalyst 2 in step S22 comprises: adding an organic solvent to the mixture after the mixture is cooled to the room temperature, stirring the mixture at a temperature of −78° C. to 0° C. to obtain an organic mixture and solid particles after solid-liquid separation, wherein the solid particles are recovered molten salt catalyst 1 or recovered molten salt catalyst 2.

9. The method of claim 8, further comprising:
adding an alkaline solution or ultrapure water to the organic mixture to quench a residual molten salt, wherein the alkaline solution is a 0.2-5 M KOH solution or a 0.2-5 M NaOH solution; and
filtering a separated organic phase with a 0.22 μm PTFE filter membrane to obtain a liquid product containing $C_9$-$C_{14}$ unsaturated alkanes and $C_9$-$C_{14}$ cycloalkanes.

10. The method of claim 8, wherein the organic solvent is one or more of dichloromethane, trichloromethane, diethyl ether, and ethyl acetate.

\* \* \* \* \*